Jan. 9, 1968  A. D. RYON  3,362,791
APPARATUS FOR SEPARATION OF IMMISCIBLE LIQUID PAIRS
INCLUDING REMOTE INTERFACE CONTROL
Filed Aug. 24, 1964

PRIOR ART PROCESS

INVENTOR.
Allen D. Ryon
BY

ATTORNEY.

United States Patent Office 3,362,791
Patented Jan. 9, 1968

3,362,791
APPARATUS FOR SEPARATION OF IMMISCIBLE LIQUID PAIRS INCLUDING REMOTE INTERFACE CONTROL
Allen D. Ryon, Oak Ridge, Tenn., assignor to the United States of America as represented by the United States Atomic Energy Commission
Filed Aug. 24, 1964, Ser. No. 391,811
3 Claims. (Cl. 23—267)

ABSTRACT OF THE DISCLOSURE

An interface level control system for two immiscible liquids of different densities has been provided which can be remotely operated. The level of the interface is controlled in a mixer-settler type liquid-liquid extraction device by applying a back pressure from a regulated air pressure source to the heavier liquid and adjusting the back pressure until the interface has reached the desired level. An automatic adjusting device in a separate vessel maintains the position of the interface at the desired level and thereby permits the system to be used for various combinations of densities of immiscible liquids.

Figure 2:
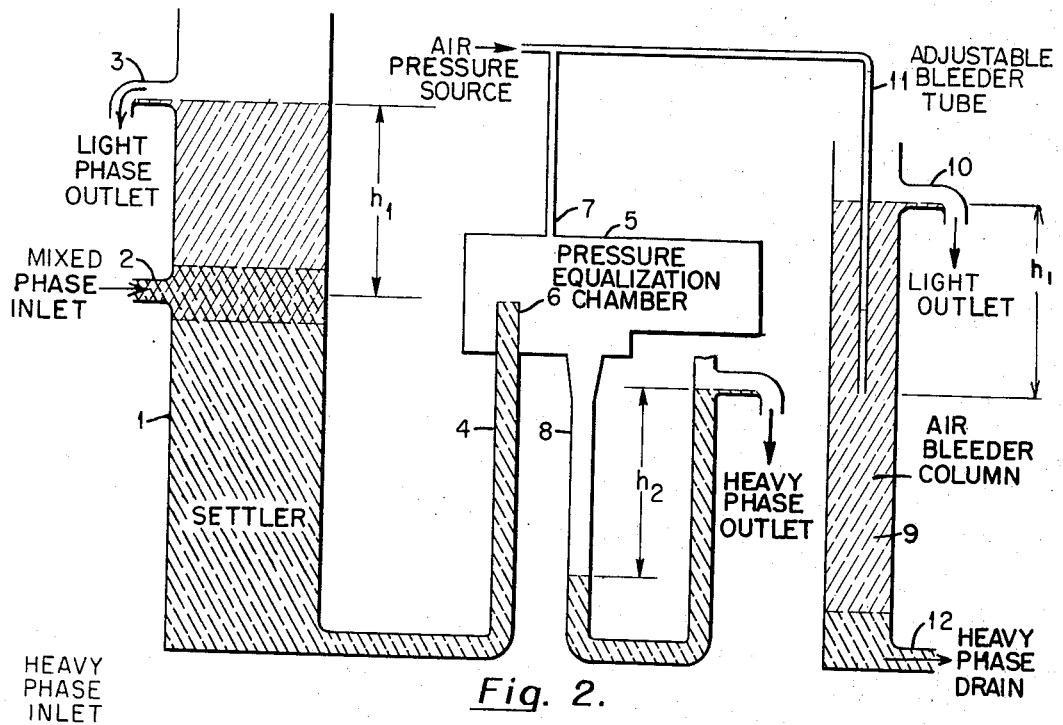

This invention relates to liquid-liquid countercurrent solvent extraction systems for the separation of radioactive substances and more particularly to a mixer-settler capable of being operated behind radiation shielding and which is remotely controlled and maintained.

In the usual mixer-settler type of liquid-liquid solvent extraction process equipment, immiscible liquids are intermittently mechanically mixed and subsequently separated by gravitational settling in a columnar settling vessel. The lighter liquid is permitted to exit via overflow weirs, while the heavier liquid exits via underflow weirs. It is important to control the position of the liquid interface in the mixer-settler, particularly in the last settler stage, in order to prevent mixed phases from discharging at either weir.

In a prior art method, pressure sensing at different levels in the contactor is accomplished by means of bleed tubes. The pressure signals obtained are utilized in controlling the differential flow rates of the liquids. In another method, floats are utilized in sensing the interface position. These methods are comparatively complex, and particularly difficult to implement in small capacity, remotely controlled systems, operated in high-radiation fields.

In one prior art form the level of the interface is controlled by joining the lower part of the separation vessel to a U-tube so that the lower portion of the heavier liquid in the upstanding part of the U-tube will be balanced against the liquid in the separation vessel. Adjusting the height of the upstanding portion of the U-tube will result in changing the level of the interface so that it may be made to assume any desired region in the separation vessel below the overflow. However, in high radiation environments where the equipment is positioned behind massive shielding, problems of maintenance and adjustment arise. Various immiscible liquids are used, depending upon the materials to be separated. These liquids may have different relative densities, so that in each case, it may be necessary to adjust the length of the upstanding U-tube to properly position the interface. These adjustments must all be made by remotely controlled maintenance equipment from outside the shielding of the hot cell.

Applicant with a knowledge of these problems of the prior art has for an object of his invention the provision of a system for automatically controlling the level of the interface between two immiscible liquids of different densities in a mixer-settler type liquid-liquid extraction device by applying a back pressure to the heavier liquid and adjusting the back pressure until the interface has reached the desired level.

Applicant has as another object of his invention the provision of an arrangement for adjusting the back pressure on a column of liquid in a separation vessel for positioning the interface between two immiscible liquids in a liquid-liquid separation vessel.

Applicant has as a further object of his invention the provision of an automatic adjusting device in a separation vessel, for maintaining the position of an interface between immiscible liquids and to thereby permit the system to be used for various combinations of densities of immiscible liquids.

Other objects and advantages of my invention will appear from the following specification and the accompanying drawings, and the novel features thereof will be particularly pointed out in the annexed claims.

Figure 1:
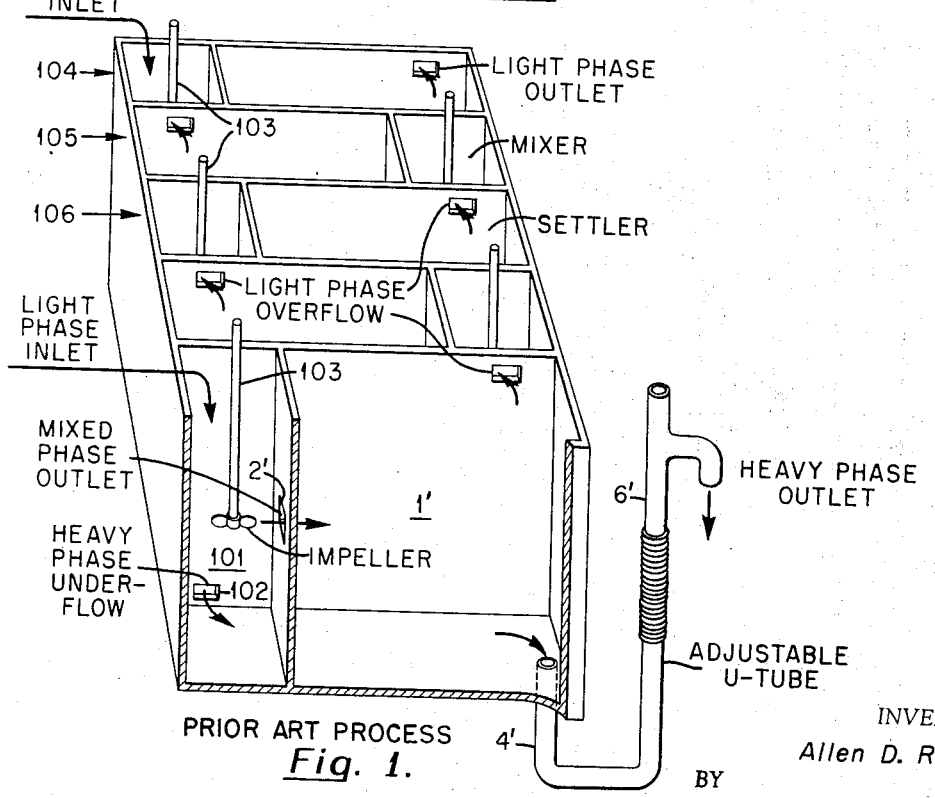

In the drawings, FIG. 1 is a schematic of a conventional counter-current system for solvent extraction. FIG. 2 is a schematic of my improved liquid interface positioning system.

Referring to the drawings in detail, FIG. 1 shows the various stages of a conventional countercurrent system for liquid solvent extraction where immiscible liquids of different densities are passed through a series of stages 104, 105, 106, etc. Each stage comprises a mixing vessel and a separating vessel such as mixing vessel 101 and separating vessel 1'. As shown, the heavier liquid is introduced at one end of the system and the lighter liquid at the other. In the mixer 101 of the final stage, the lighter liquid is introduced at the top and the heavier one at the bottom. Mixing is accomplished by a horizontally rotatable impeller 103 in each mixer stage. The mixed phases then pass into a settling compartment 1' through an intermediate port 2'. On the last stage only, a U-tube 4' is provided and the length of the U-tube portion 6' is adjusted to properly position the interface between the two immiscible liquids so that the interface does not rise to the point where it overflows vessel 1'. In the earlier stages it is not necessary to employ the U-tube for this purpose since some overflow and mixing of the two immiscible liquids will not seriously impair the final separation and recovery.

Where this process equipment is readily accessible, this is a convenient way of adjusting the system to handle immiscible liquids of different densities. However, when the system is placed in a hot cell enclosed by massive shielding and is not readily accessible, the problem of adjusting the length of leg 6' becomes important and difficult since all maintenance must be carried out from the exterior of the cell and by remote control.

The apparatus of the present invention shown in FIG. 2 is, basically, a combination of a settler member of a mixer-settler type liquid-liquid contactor, a pressure equalizing chamber, an air bleeder column and a compressed air source. The settler comprises a columnar vessel 1, a mixed phase inlet 2, an overflow type light phase outlet 3, a heavy phase outlet comprising a U-tube type conduit 4. The pressure equalizer chamber comprises a closed hollow vessel 5, an overflow tube 6 vertically disposed within said closed hollow vessel 5 in hydraulic communication with the bottom of columnar vessel 1 by U-tube type conduit 4, an air pressure port 7 through the top of said hollow vessel and a bottom connected U-tube type drain conduit 8 in communication with appropriate heavy phase overflow recovery means (not shown). The air bleeder column comprising a columnar vessel 9, an overflow 10, an adjustable-height air bleeder tube 11 and a valved heavy phase drain conduit 12. Certain dimensions within the apparatus are critical. The effective top of the overflow tube 6 is located at the desired interface level in the settler. The overflow level of U-tube drain conduit 8 is maximally below the top of overflow tube 6 and preferably below the bottom of the pressure equalizer chamber. The minimum effective height of the U-tube drain conduit 8 is at least equal to $h_1$ multiplied by the ratio of the density of the light phase $\rho_1$ to that of the heavy phase $\rho_2$, the effective height $h_2$ being given by the relation $$h_2 = h_1 \frac{\rho 1}{\rho 2}$$

The air bleeder column has a height greater than the vertical distance $h_1$ between the top of the overflow tube 6 and the light phase outlet 3. The bleeder tube 11 is adjustable to provide immersion below the overflow 10 to a depth of this same dimension $h_1$.

In operation, liquid of the processing light phase is maintained in the bleeder column 9 at the overflow level 10. A regulated air flow is permitted to flow through the bleeder tube 11, causing a build-up of pressure due to the liquid of height equal to $h_1$ in the pressure equalizer chamber. Heavy phase liquid is passed through the settler from the mixed phase input 2 to bottom, being drained off through the U-tube conduit 4, overflowing in the pressure equalizer chamber and again through the U-tube drain conduit 8, thus maintaining a constant level in the contactor. Light phase liquid is caused to flow through the contactor, overflowing at the outlet 3 and being supported by the air pressure in the air equalizing chamber, which is transmitted through the heavy phase liquid in the U-tube 4.

It should be understood that the invention is not limited to the particular embodiment described. For example, the liquid in the bleeder column may be a continuously monitored sample from the contactor system, or it may be an entirely separate solution of density equal to the processing solution. Another example of divergence from the equipment described is in the design of the various columnar vessels. Open tops are not required providing that vents from each are in pneumatic communication. Other gases, appropriate to the system may be used instead of air in the pressure regulating system.

Having thus described my invention, I claim:

1. A system for controlling the position of the interface between two immiscible liquids comprising a vessel for receiving and permitting settlement of, two immiscible liquids of different densities, an upper outlet in the vessel for overflow of the lighter liquid, and a lower outlet in the vessel for the removal of the heavier liquid, means for introducing a mixture of two immiscible liquids of different density intermediate the upper and lower outlets, an upstanding conduit connected to the lower outlet having its upper portion in open termination at an intermediate level within a closed container, a drain attached to the bottom of the closed container yieldably sealed from the atmosphere, a bubbler pressure regulator having means for vertically positioning a gas bleeder tube beneath the surface of a liquid therein for adjusting the back pressure in said line, and means for coupling the tube to the top of said closed container for applying back pressure thereto to adjust the level of the interface in the vessel.

2. The system of claim 1 wherein the drain for the closed container is in hydraulic communication with a U-shaped tube which is vented to the atmosphere.

3. The system as in claim 1 wherein the closed container is disposed at the level of the desired interface, and the bubbler pressure means pressurizes said closed container to a predetermined pressure equal to the pressure exerted by said light liquid at the interface, whereby the level of said interface is remotely controlled.

References Cited

UNITED STATES PATENTS

| | | | |
|---|---|---|---|
| 679,575 | 7/1901 | Reese | 23—270.5 |
| 3,107,982 | 10/1963 | Lindstrom | 23—270.5 |
| 3,212,854 | 10/1965 | Betts | 23—270.5 |
| 3,260,572 | 7/1966 | Faugeras | 23—270.5 |

NORMAN YUDKOFF, *Primary Examiner.*

S. EMERY, *Assistant Examiner.*